(12) United States Patent
Aitzetmueller et al.

(10) Patent No.: US 9,906,040 B2
(45) Date of Patent: Feb. 27, 2018

(54) METHOD AND ARRANGEMENT FOR DATA COMMUNICATION BETWEEN AN INVERTER AND A NETWORK MONITORING UNIT

(71) Applicant: FRONIUS INTERNATIONAL GmbH, Pettenbach (AT)

(72) Inventors: David Aitzetmueller, Scharnstein (AT); Christian Fasthuber, Wels (AT); Clemens Bittmann, Wels (AT)

(73) Assignee: FRONIUS INTERNATIONAL GmbH, Pettenbach (AT)

( * ) Notice: Subject to any disclaimer, the term of this patent is extended or adjusted under 35 U.S.C. 154(b) by 22 days.

(21) Appl. No.: 14/442,805

(22) PCT Filed: Nov. 8, 2013

(86) PCT No.: PCT/EP2013/073346
§ 371 (c)(1),
(2) Date: May 14, 2015

(87) PCT Pub. No.: WO2014/075999
PCT Pub. Date: May 22, 2014

(65) Prior Publication Data
US 2015/0288191 A1 Oct. 8, 2015

(30) Foreign Application Priority Data

Nov. 15, 2012 (AT) .............................. A 50517/2012

(51) Int. Cl.
*H02J 3/40* (2006.01)
*H02J 3/38* (2006.01)
(Continued)

(52) U.S. Cl.
CPC ................ *H02J 3/40* (2013.01); *H02J 3/383* (2013.01); *H02J 13/0024* (2013.01);
(Continued)

(58) Field of Classification Search
CPC .... H02J 13/0024; H02J 13/0051; H02J 3/383; H02J 3/40; H04B 3/54
(Continued)

(56) References Cited

U.S. PATENT DOCUMENTS 3,689,886 A 9/1972 Durkee
6,021,057 A * 2/2000 Linden .................. H02M 7/003
363/65

(Continued)

FOREIGN PATENT DOCUMENTS

CN 101026411 8/2007
CN 102594178 7/2012
(Continued)

OTHER PUBLICATIONS

Translation of Written Opinion of Int'l Searching Authority (Form PCT/ISA/237).
(Continued)

*Primary Examiner* — Thienvu Tran
*Assistant Examiner* — David M Stables
(74) *Attorney, Agent, or Firm* — Greenblum & Bernstein, P.L.C.

(57) ABSTRACT

For a simple and reliable data communication in an arrangement composed of a plurality of inverters ($3_1$, $3_2$, ... $3_n$) connected in series and a network monitoring unit (5) it is provided that the network monitoring unit (5) superimposes a synchronization pulse (10) to the network voltage ($V_N$) applied to the electrical load (4), which synchronization pulse can be detected by the inverters ($3_1$, $3_2$, ... $3_n$) for temporal synchronization.

11 Claims, 2 Drawing Sheets

Figure 1:
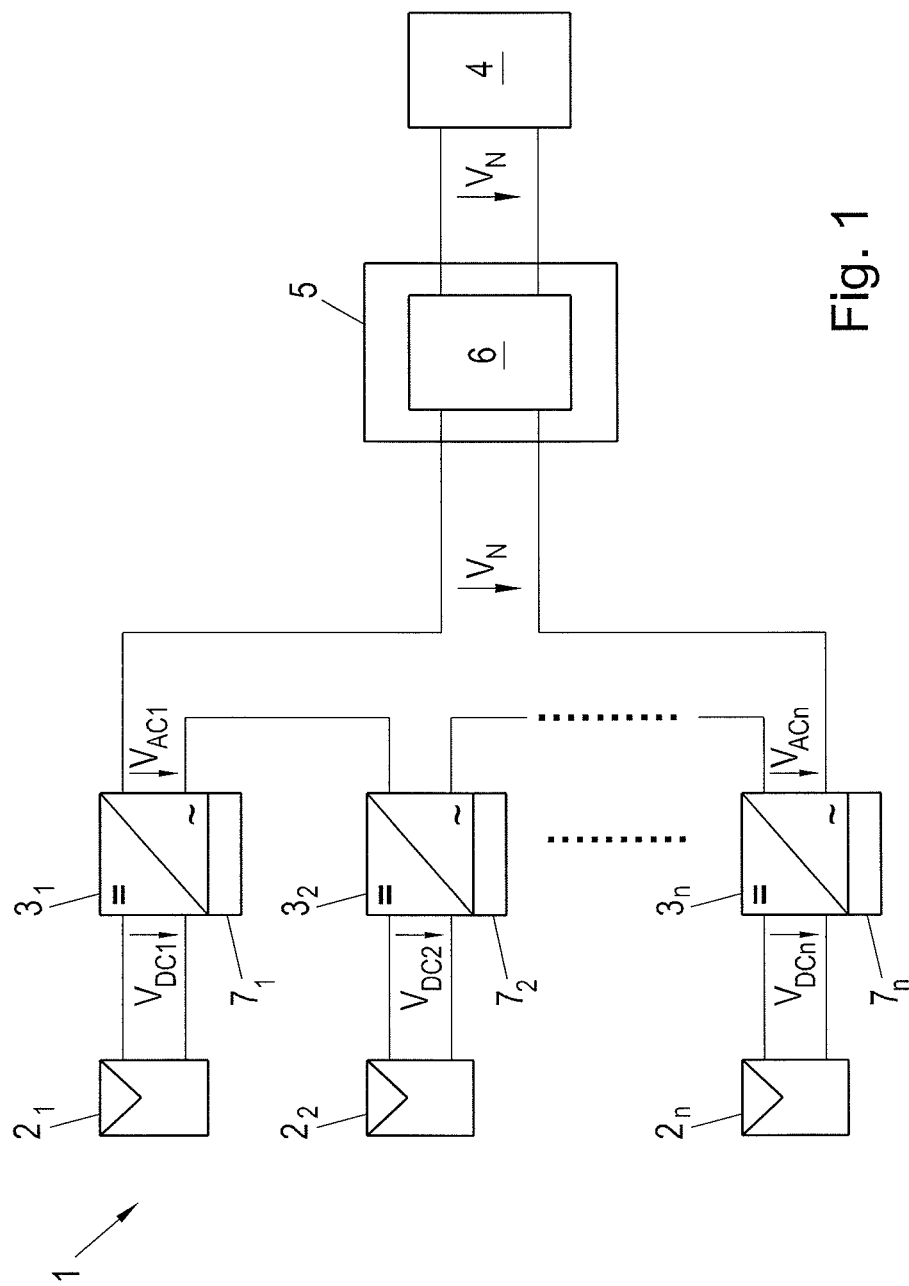

(51) Int. Cl.
  *H02J 13/00* (2006.01)
  *H04B 3/54* (2006.01)

(52) U.S. Cl.
  CPC .......... *H02J 13/0051* (2013.01); *H04B 3/54* (2013.01); *H04B 2203/5416* (2013.01); *Y02B 90/263* (2013.01); *Y02E 10/563* (2013.01); *Y02E 40/72* (2013.01); *Y02E 60/7823* (2013.01); *Y02E 60/7892* (2013.01); *Y04S 10/123* (2013.01); *Y04S 40/122* (2013.01); *Y04S 40/123* (2013.01); *Y04S 40/146* (2013.01); *Y10T 307/685* (2015.04)

(58) Field of Classification Search
  USPC .......................................................... 307/77
  See application file for complete search history.

(56) References Cited

U.S. PATENT DOCUMENTS

| | | | |
|---|---|---|---|
| 7,078,982 | B2 | 7/2006 | Bertrand |
| 2004/0086053 | A1 | 5/2004 | Anderson et al. |
| 2005/0127853 | A1* | 6/2005 | Su .................... H02M 7/487 318/108 |
| 2007/0025391 | A1 | 2/2007 | Yonge, III et al. |
| 2009/0003481 | A1 | 1/2009 | Schopfer et al. |
| 2010/0111099 | A1 | 5/2010 | Yonge, III et al. |
| 2010/0156188 | A1* | 6/2010 | Fishman ............. H02J 3/383 307/77 |
| 2010/0156189 | A1* | 6/2010 | Fishman ............. H02J 3/36 307/77 |
| 2012/0080955 | A1* | 4/2012 | Fishman .......... H01L 31/02021 307/82 |
| 2012/0091817 | A1* | 4/2012 | Seymour ............. H02J 3/383 307/82 |
| 2012/0175964 | A1 | 7/2012 | Yoscovich et al. |
| 2013/0155735 | A1* | 6/2013 | Ilic .................... H02M 7/72 363/71 |
| 2014/0132075 | A1* | 5/2014 | Fishman ............. H02J 3/383 307/82 |
| 2014/0292085 | A1 | 10/2014 | Yoscovich et al. |

FOREIGN PATENT DOCUMENTS

| | | |
|---|---|---|
| DE | 100 59 219 | 6/2002 |
| DE | 10 2007 003 010 | 8/2007 |
| EP | 1 483 819 | 12/2002 |
| EP | 1 748 574 | 1/2007 |
| GB | 2 483 317 | 3/2012 |

OTHER PUBLICATIONS

Austrian Office Action conducted in counterpart Austrian Appln. No. A 50517/2012 (Sep. 18, 2013).
China Search Report and Office Action conducted in counterpart China Appln. No. 201380059186.1 (Sep. 18, 2016) (with partial English language translation).

* cited by examiner

METHOD AND ARRANGEMENT FOR DATA COMMUNICATION BETWEEN AN INVERTER AND A NETWORK MONITORING UNIT

The present application relates to a method for data communication between a network monitoring unit connected to an electrical load and a plurality of inverters connected in series on the output side, wherein the inverters and the network monitoring unit are temporally synchronized to one another.

Photovoltaic systems usually comprise a plurality of solar panels which supply direct voltage of a certain magnitude, depending on the insolation. This direct voltage is converted into alternating voltage or alternating current by an inverter and is supplied into an electric power supply network, or is connected to an electrical load such as an electrical machine or a battery charging station. Different configurations have become known. The present invention refers to an arrangement in which each solar panel is provided with its own inverter and in which the individual inverters are connected in series, wherein the sum of output voltages of the inverters corresponds to the voltage of the electric power supply network or the electrical load. Such an arrangement is known, e.g., from GB 2 483 317 A. Therein, it is also explained that the individual inverters have to be synchronous to one another and to the supply network or the load. For this purpose it is proposed to evaluate the network voltage, e.g., with respect to amplitude, phase and frequency, by means of a sensor and to send this information to synchronization units of the individual inverters. This can take place via separate control lines or by means of power-line communication. However, GB 2 483 317 A does not describe how the synchronization is to be carried out in detail.

EP 1 483 819 B1 describes a method for controlling electrical devices by means of power-line communication. For this purpose a power supply network is connected to a plurality of subscribers, which communicate with one another and therefore have to be synchronized to one another. For synchronization, the subscribers use the zero-crossing of the network voltage to establish a channel grid having a transmitting and receiving cycle. Each transmitting and receiving cycle is limited by zero-crossings of the network voltage. For this purpose, each subscriber has to monitor the network voltage in terms of zero-crossings and has to be configured accordingly. However, this kind of synchronization can only work if the individual subscribers are connected to the power supply network in parallel. Thus, this power-line communication method would not function in an arrangement according to GB 2 483 317 A.

It is now an object of the present invention to provide an arrangement and a method by means of which simple and reliable data communication in an arrangement of a plurality of serially-connected inverters is possible.

This object is achieved according to the invention in that the network monitoring unit superimposes a synchronization pulse to the network voltage applied to the electrical load, which synchronization pulse is detected by the inverters for temporal synchronization. This synchronization pulse can be detected by all serially-connected inverters so that the inverters can easily synchronize themselves to the network monitoring unit for data communication. Moreover, the synchronization pulses form defined periods in which any communication protocol can be implemented.

Particularly advantageously, at least two data channels of a predetermined time period are formed between two successive synchronization pulses. The data channels can then be used by the inverters and the network monitoring unit in accordance with the communication protocol.

The reliability of the data communication can be improved if a predetermined pulse duration is provided between sending or detecting the synchronization pulse and the first data channel so that the synchronization pulse can sufficiently decay before data is sent via the line.

The synchronization pulse is advantageously related to a defined, unique and easily detectable reference point of the network voltage and is sent after a predetermined delay time after this reference point, preferably the zero-crossing or peak of the network voltage.

The delay time can advantageously be used for sending additional data from an inverter to the network monitoring unit, e.g. for signaling an emergency situation of an inverter or, vice versa, for addressing an inverter, for example. In this manner, further information that is important for the operation of the system can be transmitted in a simple manner without limiting the bandwidth of the data communication. Accordingly, signaling an emergency situation can also result in an emergency shutdown so that safety of the system and safety for the user is increased.

Figure 3:
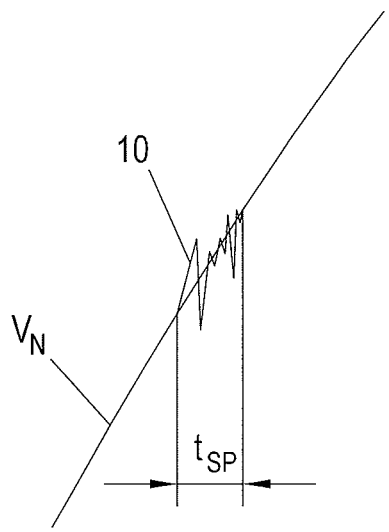
Figure 4:
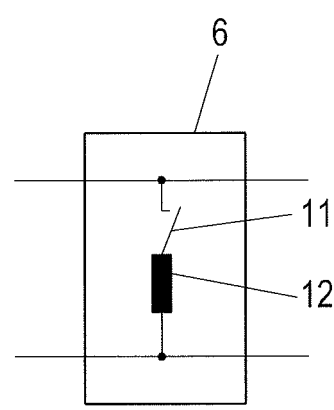

The present invention is explained in greater detail below with reference to the FIGS. 1 to 4, which by way of example and schematically show advantageous configurations of the invention. In the figures FIG. 1 shows a block diagram of a photovoltaic system of an electrical load, FIG. 2 shows the network voltage with synchronization pulses, FIG. 3 shows an enlargement thereof, and FIG. 4 shows a configuration of a synchronization unit.

A photovoltaic system 1 comprises a series of photovoltaic modules $2_1, 2_2, \ldots 2_n$. Each photovoltaic module $2_1, 2_2, \ldots 2_n$ is connected in a manner known per se to an associated inverter $3_1, 3_2, \ldots 3_n$, which converts in each case the direct voltage $V_{DC1}, V_{DC2}, \ldots V_{DCn}$ of the photovoltaic module $2_1, 2_2, \ldots 2_n$ into an alternating voltage $V_{AC1}, V_{AC2}, \ldots V_{ACn}$ at the output of the inverter $3_1, 3_2, \ldots 3_n$. The inverters $3_1, 3_2, \ldots 3_n$ are connected in series by their outputs, wherein the sum of the alternating voltages $V_{AC1}, V_{AC2}, \ldots V_{ACn}$ corresponds to the network voltage $V_N$ of the supply network to be supplied or of the electrical consumer (generally designated as electrical load 4) to be supplied in terms of amplitude and phase. The network voltage $V_N$ is monitored in a network monitoring unit 5 connected to the electrical load 4. To this end, the network monitoring unit 5 is connected in parallel to the inverters $3_1, 3_2, \ldots 3_n$ which are connected in series to each other. Furthermore, a synchronization unit 6 responsible for synchronizing the individual inverters $3_1, 3_2, \ldots 3_n$ to the network voltage $V_N$ is arranged in the network monitoring unit 5, as explained in detail below. For this purpose, each inverter $3_1, 3_2, \ldots 3_n$ also comprises a control unit $7_1, 7_2, \ldots 7_n$ which evaluates the synchronization information of the synchronization unit 6 and controls the inverters $3_1, 3_2, \ldots 3_n$ for synchronizing to the network voltage $V_N$.

Figure 2:
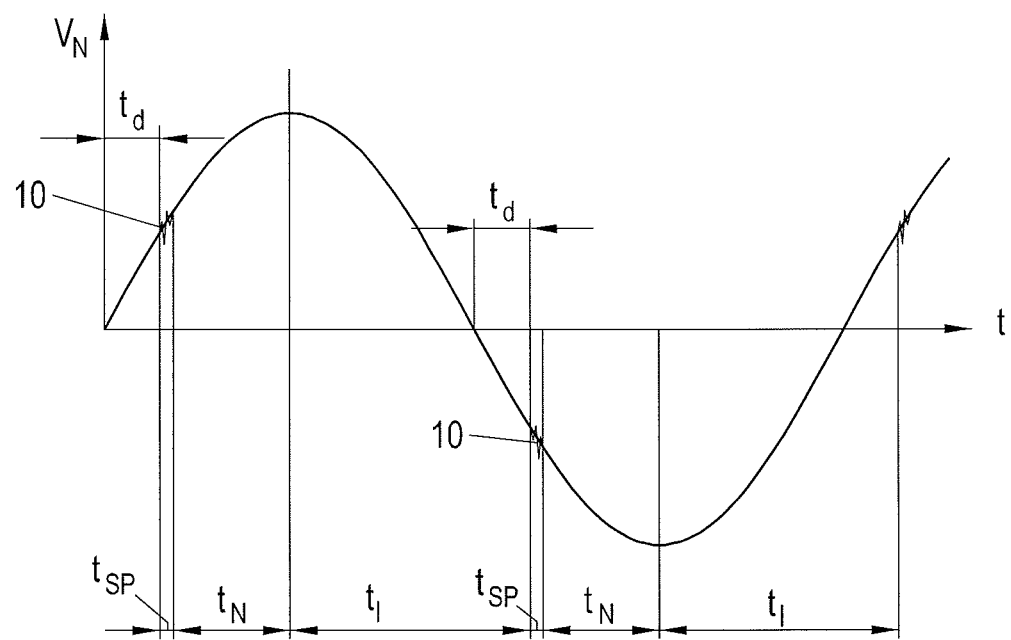

FIG. 2 shows the curve of the network voltage $V_N$ over time. In a predetermined interval $t_d$ from the zero-crossing, a short synchronization pulse 10 (see FIG. 3) is generated by the synchronization unit 6 and is superimposed to the network voltage $V_N$. Due to the series connection of the inverters $3_1, 3_2, \ldots 3_n$, this synchronization pulse 10 can be detected by each inverters $3_1, 3_2, \ldots 3_n$ or more specifically by the associated control unit $7_1, 7_2, \ldots 7_n$ and therefore represents a unique temporal reference to which the inverters $3_1, 3_2, \ldots 3_n$ can synchronize to. Thereby it is of course also possible to send the synchronization pulse 10, at a different unique point in time of the network voltage $V_N$, e.g. at the peak of the network voltage $V_N$, with or without delay $t_d$.

Following the synchronization pulse 10, a time period $t_N$, $t_I$, a so-called data channel, is defined, which can be used for sending data. In so doing, one data channel or even a plurality of data channels can be provided between two synchronization pulses 10. After detecting a synchronization pulse 10, there is preferably a waiting period in the length of a predetermined pulse duration $t_{SP}$ prior to the beginning of a data channel.

For data communication, two data channels are defined in FIG. 2, as an example. For this purpose, a waiting period of a predetermined pulse duration $t_{SP}$ is implemented after the detection or after sending the synchronization pulse 10. Thereafter, data can be sent from the network monitoring unit 5 to the inverters $3_1, 3_2, \ldots 3_n$ for a given period $t_N$. This can also be used for centrally controlling the inverters $3_1, 3_2, \ldots 3_n$ in dependence on the state of the electrical load 4 by control signals from the network monitoring unit 5, e.g. by specifying voltage values $V_{AC}$, frequency, active and reactive power, etc. Then, a second data channel over the time period $t_I$ follows, for sending data, e.g., status data, operating data, data for central monitoring etc., from the inverters $3_1, 3_2, \ldots 3_n$ to the network monitoring unit 5. Here, a transmission cycle takes one period of the network voltage $V_N$.

However, it is also conceivable that each xth synchronization pulse 10, even a plurality of successive synchronization pulses, are used for synchronizing the sending of data in one direction, e.g. from the network monitoring unit 5 to the inverters $3_1, 3_2, \ldots 3_n$, and the other synchronization pulses 10 are used for sending data in the other direction, e.g. from the inverters $3_1, 3_2, \ldots 3_n$ to the network monitoring unit 5. For example, it could be provided that only each second synchronization pulse 10 is used for sending in one direction. It is also possible, e.g., that two successive synchronization pulses 10 are used for sending in one direction, and the subsequent third synchronization pulse 10 is used for sending in the other direction, whereupon the cycle is repeated.

In this manner, a full wave or a half-wave of the network voltage (as in FIG. 2) can be used for data communication. At a network frequency of 60 Hz, as is usual in North America or Asia, this results in a time period of approx. 16.7 ms (full wave) or 8.35 ms (half-wave) for the provided data channels. At a network frequency of 50 Hz, as is usual in Europe, the time period is 20 ms.

However, also conceivable is a configuration in which a plurality of such photovoltaic modules $2_1, 2_2, \ldots 2_n$, which are connected in series via the inverters $3_1, 3_2, \ldots 3_n$, are connected in parallel to one another and to the network monitoring unit 5 or the electrical load 4. For example, three strings, each having ten inverters connected in series, can be connected in parallel to the network monitoring unit 5 or the electrical load 4. Because of parallel connection the synchronization pulse 10 is sent into each string composed of inverters connected in series and can be detected for synchronization reasons by the inverters.

Of course, any adaptations are conceivable and possible here. For example, more than two data channels could be implemented, or a transmission cycle can also be longer than a period of the network voltage $V_N$.

Any suitable communication protocol can be implemented for data communication. For physically implementing the data transmission, the well-known methods of power-line communication can be used.

Likewise, it could be provided that also one of the inverters $3_1, 3_2, \ldots 3_n$ or the associated control units $7_1, 7_2, \ldots 7_n$ can send a synchronization pulse 10 towards the network monitoring unit 5 and/or to further inverters $3_1, 3_2, \ldots 3_n$, even asynchronously, e.g. to signalize an emergency situation or to trigger a certain necessary intervention of the network monitoring unit 5, such as for example an emergency stop of the photovoltaic system 1 or disconnection of the photovoltaic system 1 from the electrical load 4. The synchronization pulse 10 towards the network monitoring unit 5 could also be sent during the delay time $t_d$, for example.

Likewise, further data, e.g. address information for selecting a certain inverter $3_1, 3_2, \ldots 3_n$, can be sent during the delay time $t_d$.

It could also be provided that one of the inverters $3_1, 3_2, \ldots 3_n$ assumes the function of the network monitoring unit 5, whereby a separate network monitoring unit 5 could be saved.

The synchronization pulse 10 can be generated in many different ways. For example, an impedance 12 could be connected between a phase and a neutral conductor in series with a switch 11, as illustrated in FIG. 4. When the switch 11 is open, electrical energy is stored in the impedance 12, which electrical energy discharges upon closing of the switch 11 and generates a synchronization pulse 10. Other possibilities of generating and detecting a synchronization pulse 10 are described in U.S. Pat. No. 7,078,982 B2.

In particular with a power-line method for data communication, in which the data signal is superimposed to the carrier signal (network voltage), the first bit of the date to be transmitted could also be used and detected as a synchronization pulse 10. I general, a special point in time such as the beginning or the end of the data transmission can also be used as a synchronization pulse 10.

Instead of transmitting the synchronization pulse 10 via the outputs of the inverters $3_1, 3_2, \ldots 3_n$ connected in series, a separate control line for data communication could also be provided between the network monitoring unit 5 and the inverter $3_1, 3_2, \ldots 3_n$. In this case, the synchronization pulse 10 would simply be sent to the inverters $3_1, 3_2, \ldots 3_n$ via the control lines.

The invention claimed is:

1. A method for data communication between a network monitoring unit, which is connected to an electrical load, and a plurality of inverters having outputs connected in series, the method comprising:

superimposing, via the network monitoring unit, at least two synchronization pulses pulse to on a network voltage applied to the electrical load, wherein the at least two synchronization pulses have a predetermined pulse duration, and detecting the at least two synchronization pulses by the plurality of inverters, by which the plurality of inverters and the network monitoring unit are temporally synchronized to one another, wherein at least one data channel of a predetermined time period is formed between the at least two synchronization pulses, and wherein, after detecting a first of the at least two synchronization pulses, the predetermined pulse duration provides a waiting period between:

one of the superimposing of the first synchronization pulse or the detecting of the first synchronization pulse; and a beginning of the at least one data channel.

2. The method according to claim 1, wherein the at least two synchronization pulses comprise two successive synchronization pulses and the at least one data channel of the predetermined time period is formed between the two successive synchronization pulses.

3. The method according to claim 1, wherein the at least two synchronization pulses comprise two successive synchronization pulses and the at least one data channel comprises at least two data channels of predetermined time periods are formed between the two successive synchronization pulses.

4. The method according to claim 1, wherein the at least two synchronization pulses are is superimposed on the network voltage after a predetermined delay time after a reference point of the network voltage.

5. The method according to claim 4, wherein, during the delay time, data is sent from at least one of the plurality of inverters to the network monitoring unit or from the network monitoring unit to at least one of the plurality of inverters.

6. The method according to claim 4, wherein the at least two synchronization pulses are superimposed on the network voltage after a predetermined delay time after one of a zero-crossing or a peak of the network voltage.

7. An arrangement for data communication between a network monitoring unit, which is connected to an electrical load, and a plurality of inverters having outputs connected in series, comprising:
   a synchronization unit for generating at least two synchronization pulses superimposed on the network voltage applied to the electrical load, the network monitoring unit comprising the synchronization unit, wherein the at least two synchronization pulses have a predetermined pulse duration,
   wherein the plurality of inverters are configured to detect the at least two synchronization pulses to temporally synchronize the plurality of inverters to the network monitoring unit,
   wherein at least one data channel of a predetermined time period is formed between the at least two synchronization pulses, and
   wherein, after detecting a first of the at least two synchronization pulses, the redetermined pulse duration provides a waiting period between:
      the first superimposed synchronization pulse or the detecting of the first superimposed synchronization pulse; and
      a beginning of the at least one data channel.

8. The arrangement according to claim 7, further comprising a plurality of photovoltaic modules, wherein each of the plurality of photovoltaic modules are connected to inputs of respective ones of the plurality of inverters.

9. The arrangement according to claim 7, wherein each of the plurality of inverters comprises a control unit.

10. The arrangement according to claim 7, wherein the at least two synchronization pulses are superimposed on the network voltage after a predetermined delay time after one of a zero-crossing or a peak of the network voltage.

11. A arrangement for data communication between a network monitoring unit, which is connected to an electrical load, and a plurality of inverters having outputs connected in series, comprising:
   a synchronization unit for generating a synchronization pulse superimposed on the network voltage applied to the electrical load, the network monitoring unit comprising the synchronization unit,
   wherein the plurality of inverters are configured to detect the synchronization pulse to temporally synchronize to the network monitoring unit, and
   wherein the synchronization unit comprises an impedance connected in series with a switch between a phase and neutral conductor.

* * * * *